Nov. 8, 1927.
J. V. PUGH
1,648,821
WHEEL BRAKE FOR VEHICLES
Original Filed Oct. 15, 1926     4 Sheets-Sheet 2
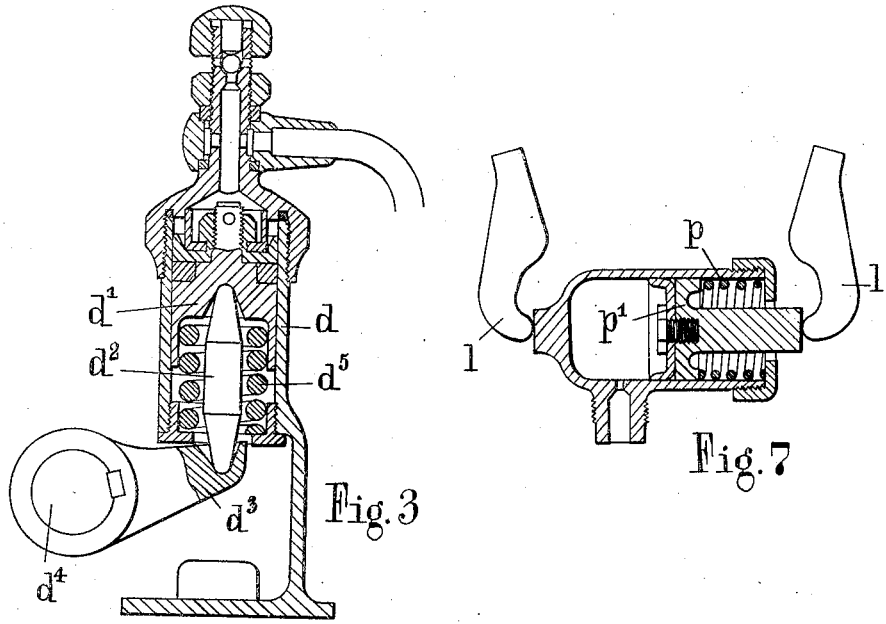
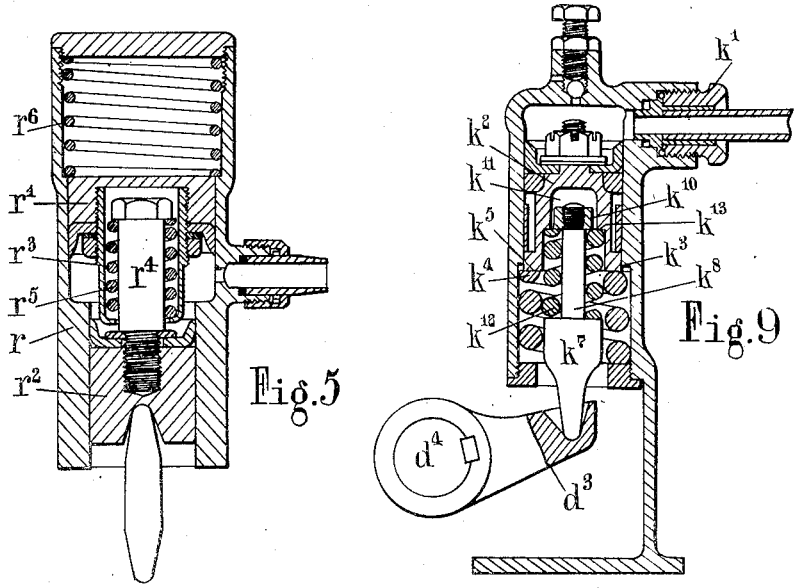
J. V. Pugh
inventor
By: Marks & Clerk
Attys

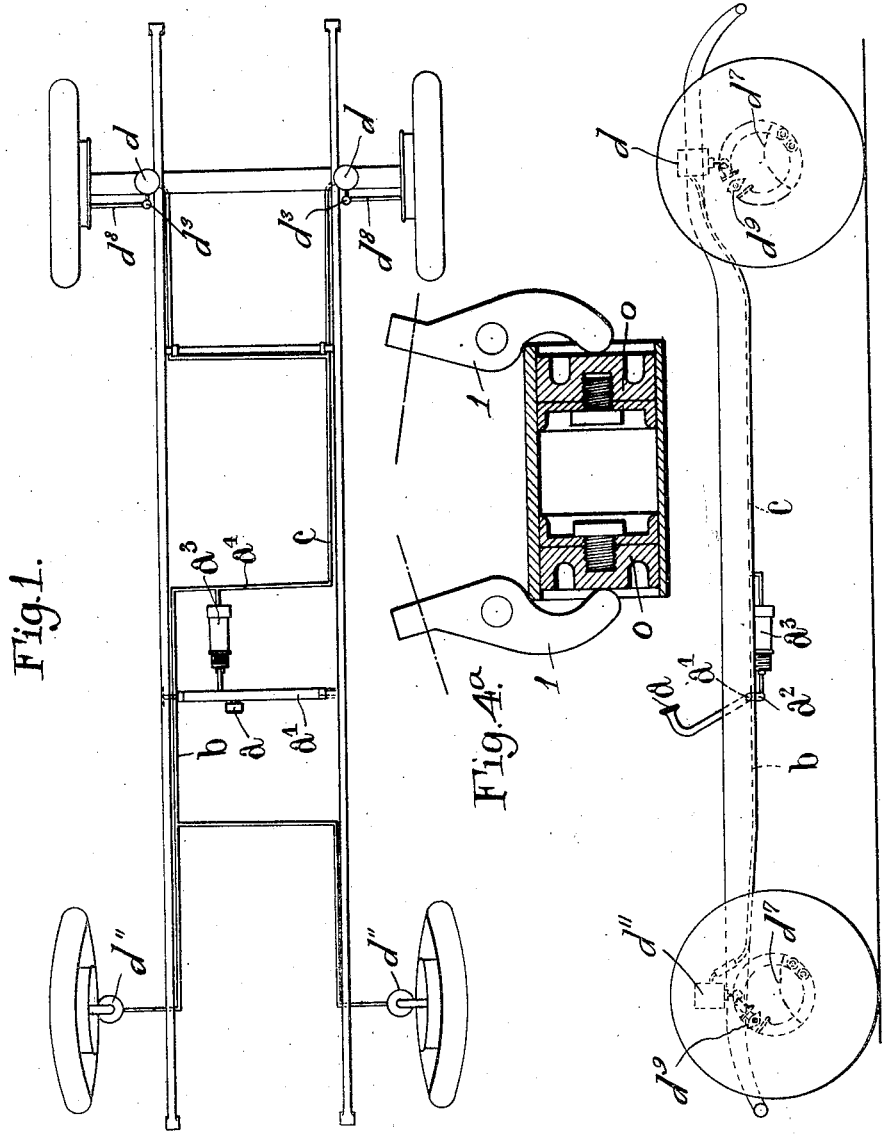

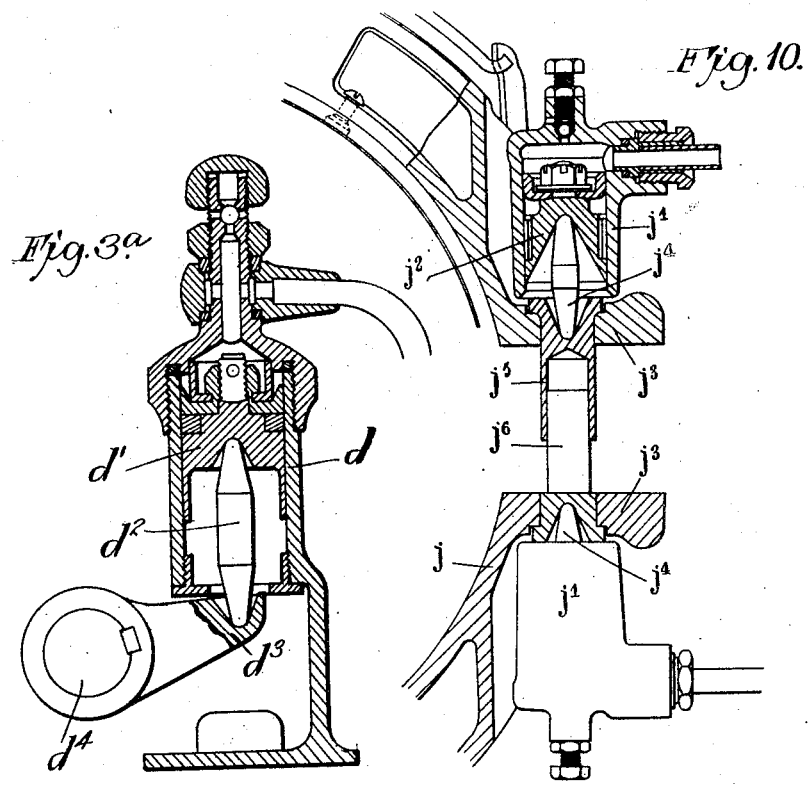
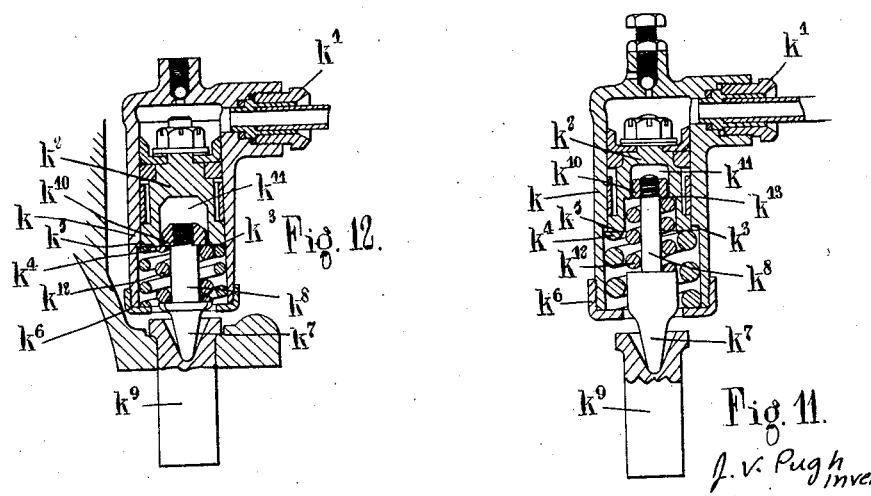

Nov. 8, 1927.

J. V. PUGH

WHEEL BRAKE FOR VEHICLES

Original Filed Oct. 15, 1926    4 Sheets-Sheet 4

J. V. Pugh
Inventor
By: Marks & Clerk
Attys.

Patented Nov. 8, 1927.

1,648,821

UNITED STATES PATENT OFFICE.

JOHN VERNON PUGH, OF COVENTRY, ENGLAND, ASSIGNOR TO RUDGE-WHITWORTH, LIMITED, OF COVENTRY, ENGLAND.

WHEEL BRAKE FOR VEHICLES.

Original application filed October 15, 1926, Serial No. 141,826, and in Great Britain October 13, 1925. Divided and this application filed March 17, 1927. Serial No. 176,149.

This invention relates to braking gear for vehicle wheel brakes at the fore and aft or front and rear ends of a vehicle, the transmission system being of the kind wherein a fluid column such as a hydraulic piping system is employed as the force-transmitting agent between the region of application of power to the gear and the application of gripping forces to the wheel brakes.

The object of the present invention is to provide improved transmission systems adapted to facilitate the apportionment of the gripping forces among the wheels of a vehicle.

According to the present invention a fluid column is employed for transmitting pressure from a power-application member to the wheel braking devices at both ends of a vehicle and the system is provided with modifying means which are inserted between the force-application member and back wheel brake drum gripping devices so that after some predetermined pressure is reached the braking effect at the front end begins to exceed that at the back.

The invention further consists in an appliance in accordance with the preceding paragraph in which a fluid-actuated element acts upon a transmission device and likewise upon resilient means which abut also against a fixed abutment and by which the movement of said element is opposed.

The invention further consists in a fluid column actuated braking gear in which a force-applying member such as a single pedal-operated plunger acts upon a fluid column system for actuating brake drum gripping devices at both ends of a vehicle and the gripping devices at the front end are operated directly from a fluid-actuated element such as a piston, while at the back end means such as a piston opposed by a resilient resistance device actuates the drum-gripping devices through the intermediary of initially compressed resilient transmission means.

The invention also consists in improvements in or relating to fluid column transmission means for operating wheel brakes for vehicles as hereinafter described.

Referring now to the accompanying drawings which show by way of example some ways of carrying the invention into effect:—

Figures 1 and 2 show in plan and side elevation a chassis fitted with brakes in accordance with the invention;

Figure 3 is a section on the axis of a single-ended cylinder for applying the brake by means of a torque shaft;

Figure 3$^a$ is a section the same as shown in Figure 3 with the spring $d^5$ removed.

Figure 4:
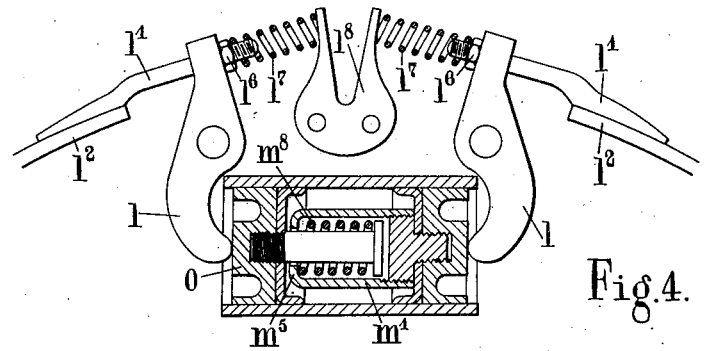
Figure 6:
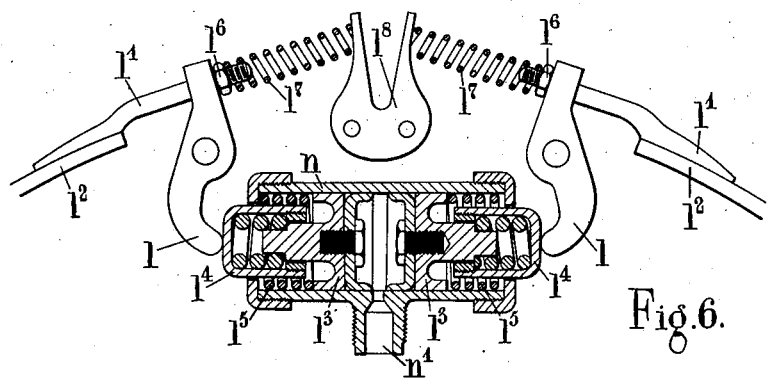
Figure 8:
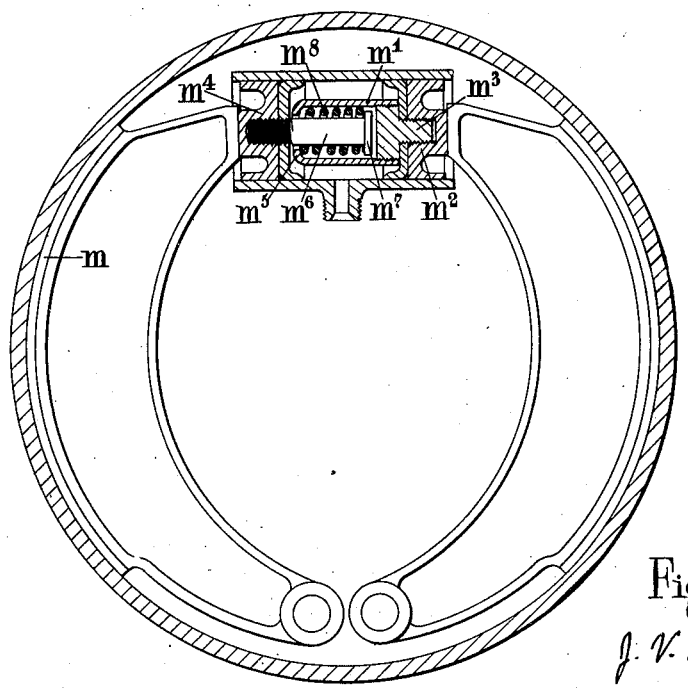

Figures 4 and 4$^a$ are sections of double-ended cylinders acting on a tension brake of which the ends only are shown;

Figure 5 is a section of a cylinder for back wheel brakes and fitted with two pistons of different diameters;

Figure 6 is a section on the axis of another double-ended cylinder operating a tension brake;

Figure 7 is a section of a single-ended cylinder for operating tension brakes similar to those shown in Figures 4 and 6;

Figure 8 is a section of a double-ended cylinder operating an expanding brake;

Figure 9 is a section of another torque shaft arrangement such as shown in Figure 3;

Figure 10 is a section of a drum-gripping band actuated by two cylinders for front wheel brakes, and Figures 11 and 12 show details of the cylinders for back wheel brakes in the brake construction shown in Figure 10.

When applying brakes to the wheels at both ends of a vehicle, it is desirable to apportion the gripping force in such a manner that it does not at either end exceed the amount which may be usefully employed in view of the retarding effect that the particular wheels can exert on the vehicle owing to the pressure which they apply to the road surface, and this will depend upon the deceleration which is applied to the vehicle and to the distribution of its total weight among the various wheels and the height of the centre of gravity above the wheel base. Generally speaking the retarding effect of the front wheels increases when the total power applied to the pedal or other force-application member is increased.

The invention herein described is divided out from application Serial No. 141,826 covering the actuation from the same pedal or force-application member of two plungers with separate piping or fluid column systems one for the front wheels and one for the back wheels so that the apportionment may be varied by varying the conditions in the two systems. Under the present invention comes the use of a common piping or fluid column system and means coacting with the fluid-operated pistons to vary the gripping force at the opposite ends of the vehicle.

In carrying the invention into effect in the convenient constructions shown by way of example in Figures 1 and 2, the pedal $a$ to which the braking power is applied operates by the shaft $a'$ and arm $a^2$ a pressure plunger $a^5$ Figure 1 in a cylinder $a^3$ which is connected to a hydraulic pipe system comprising the transverse pipe $a^4$ together with the part $b$ leading to the brake devices for the front wheels and the part $c$ leading to the brake devices for the back wheels.

For both the front and back wheels the fluid will operate pistons which apply the brake devices in any ordinary known way. As shown in Figures 1, 2 and 3 a piston $d'$ in a cylinder $d$ moves by means of a strut $d^2$ the free end of a lever arm $d^3$ upon a torque shaft $d^4$ which in the case of the front wheels is parallel with the centre line of the vehicle and applies the brake in any known way. As shown in Figure 2 the cylinders $d''$ and $d$ operate cams $d^9$ which displace the brake shoes $d^7$ to apply the brakes.

The spring $d^5$ as shown in Figure 3 is provided only in the cylinders which operate the back wheel brakes and not in the cylinders operating the front wheels as shown in Figure $3^a$. The spring is arranged to come into action at any desired limit after which the forward braking will be increased much more rapidly than the rearward braking.

Another way of regulating the back wheel brake pistons after travelling a certain desired amount is shown in Figure 5 which illustrates two pistons $r'$ and $r^2$ in a cylinder $r$, the piston $r'$ being of larger diameter than the piston $r^2$. These two pistons are connected by means of a tubular member $r^3$, central tension stud $r^4$ and spring $r^5$ which is put into compression by the fluid pressure.

Acting against the larger piston $r'$ is an initially compressed spring $r^6$ which acts against the pressure of the fluid upon the other side of the piston. When the pressure of the fluid reaches a certain point the initially compressed spring $r^6$ begins to compress or shorten and the movement of the larger piston $r'$ will cause a load opposing the fluid-pressure load on the smaller piston $r^2$. By suitably chosen characteristics of the spring the gripping force can be varied after the pressure exceeds the initial compression of the spring $r^6$ so that the gripping force either increases slightly or decreases with a further movement of the pedal.

In another modification a single cylinder may be employed for applying either a tension band to the exterior of a brake drum as in Figures 4, 6 and 7 or expandable shoes to the interior thereof as in Figure 8.

In the former case the cylinder may be arranged either by means of two movable pistons, one at each end of the cylinder, Figures 4 and 6, or, with a movably mounted cylinder, by one movable piston and using the cylinder end itself for the other abutment, Figure 7, to push apart the ends of two levers $l$ pivotally mounted at equal distances from the centre of the brake drum and engaging at their opposite ends the two ends $l''$ of a brake band $l^2$ encircling the same. In this case the brakes for the fore end wheels will have the pistons $o$ contacting directly with the levers $l$ connected to the gripping members as shown in Figure $4^a$ but as shown in Figure 4 the connecting member $m'$ and spring $m^8$ will be provided on the brakes for the back wheels, or the pistons $l^3$, Figure 6, for the rear end wheel brakes may be connected to the gripping members through the intermediary of resilient transmission devices $l^4$ and in combination with resilient resistance means such as the springs $l^5$.

As shown in Figure 8 the hydraulic cylinders operate directly between the ends of the two halves of an internal expanding brake $m$, the drawing showing a connecting member $m'$ and spring $m^8$ which are only required in the rear or aft end wheel brake cylinders as above indicated.

In arrangements operated by a single cylinder as last described, this may, as shown in Figure 6, be formed as a plain tube $n$ with a pipe connection $n'$ at the middle and fitted with an outwardly moving piston $l^3$ at each end, said pistons pressing either directly or through resilient devices upon the inner ends of two-arm levers $l$, the outer ends of which are connected to the brake band $l^2$ in such a manner as to tension the same when the inner ends of the levers $l$ are pushed out by the pistons. The outer ends of the levers are formed with an eye through which a screwed member $l'$ attached to the end of the brake band $l^2$ projects and are provided with nuts $l^6$ for tightening the same. These nuts $l^6$ of the screwed members $l'$ which are directed towards one another are each provided with a coiled spring $l^7$ and the two springs find their abutments upon the arms of a central fixed element $l^8$, one pressing upon one side and the other upon the other side. These springs are for the purpose of releasing the brake.

The tubular member $m'$ shown in Figure 4 or 8 is attached to the piston $m^2$ by the stud $m^3$ and projecting to within a short distance of the other piston $m^4$ where it is provided with an inturned flange $m^5$ leaving a central orifice and within this tubular member $m'$ is a tension element $m^6$ screwed into the other piston $m^4$ and having a head $m^7$ adjacent to the stud $m^3$ which head moves with easy clearance in the bore of the tubular member $m'$. The annular space between the head $m^7$ and the inturned flange $m^5$ at the other end of the tubular member is occupied by a coiled compression spring $m^8$ and movement of the pistons $m^2$ and $m^4$ away from one another will have the effect of compressing this spring which may be arranged to come into operation at any desired point of the movement of the pistons.

The resilient transmitting devices and also the resilient opposing or resistance means may one or both be given some initial compression if desired in order to regulate the variations in the power which is applied to the brakes. The resilient opposing device may also be arranged so that it only comes into operation after the fluid-actuated element has moved through a certain proportion of its total movement.

In the gear for the front wheels shown in Figures 1, 2 and 3 relative movement between the drum-gripping devices and the hydraulic cylinders is provided for but when this is not permissible as in other constructions the fore end piping is arranged to permit movement of the cylinders with the wheels when steering.

In the form of the invention shown in Figure 10 the brake drum is surrounded by a band structure $j$ formed in two halves hinged together upon one side (not shown in the drawing) and with a space between the ends upon the other side, and the brake power is applied from two cylinders $j'$ mounted to move with the wheels during steering and fixed relative and opposite to each other adjacent the outer side of the lugs $j^3$ projecting from the separated ends of the band $j$, said cylinders having pistons $j^2$ therein fitted for use with the fore end brakes with thrust members $j^4$ which operate upon the lugs $j^3$ through the instrumentality of the telescoping guides $j^5$, $j^6$ to force the separated ends of the band $j$ together and grip the drum.

Figure 11 or 12, shows a cylinder for use with a rear or aft end brake of the kind last described, the cylinders $k$ as shown in Figure 11 being provided at the end to which the pipe connection $k'$ is attached with a piston $k^2$ having suitable cup leather and packing devices but the working stroke of the piston occupying only a portion extending to $k^3$ of the length of its cylinder. Within the remainder of the length which is of larger diameter is a coiled spring $k^4$ adapted to easily work in the large diameter region of the cylinder $k$. One end of this spring $k^4$ contacts with the outer end $k^5$ of the piston $k^2$ while the other end is retained by an inwardly flanged and centrally perforated cap $k^6$ screwed upon the end of the cylinder $k$ and it forms a resilient resistance to oppose the movement of the piston.

To transmit the movement of the piston $k^2$ to the end of the brake band a shouldered strut $k^7$, $k^8$ is provided, the outer and larger diameter end $k^7$ of which goes through the perforated cap $k^6$ and presses upon the end of the brake band by means of a guide piece $k^9$, while the inner and smaller diameter end $k^8$ is provided with a screwed collar $k^{10}$ at its extremity which is an easy sliding fit in a cavity $k^{11}$ formed in the piston $k^2$. A coiled spring $k^{12}$ of small enough diameter to work within the other spring $k^4$ surrounds the small end $k^8$ of the strut, abutting at its outer end against the shoulder of the enlarged end $k^7$ and at its inner end against the collar $k^{10}$ screwed upon the extremity of the strut. This forms a resilient transmission device and by means of the collar $k^{10}$ any desired initial stress may be put upon the spring $k^{12}$. The inner end of this spring $k^{12}$ in addition abuts against a step $k^{13}$ in the cavity $k^{11}$ in the piston so that the movement of the piston $k^2$ is transmitted to the end of the brake band through the resilient member formed by the smaller diameter coiled spring $k^{12}$ upon the strut $k^7$, $k^8$, and at the same time the piston in its outward movement presses at any arranged position of the piston's movement upon the larger diameter coiled spring $k^4$ in the end of the cylinder $k$ and thus the actual force imparted to the gripping band at any position may be adjusted and controlled.

Figure 12 operates in the same manner as Figure 11 with slight differences in the sizes and arrangement of the spring and Figure 9 shows a similar combination of resilient resistance and resilient transmission devices for operating a torque shaft as in Figure 3.

Other modifications and additions may also be introduced without in any way departing from the spirit of this invention.

Having now described my invention, what I claim as new and desire to secure by Letters Patent is:—

1. A system of hydraulic front and rear brake control comprising a plunger means for operating the same, a piping system subjected to pressure created by said plunger, wheel-braking devices at the front and rear ends of a vehicle, separate piston means connected to said piping for operating the devices at each end, and resilient means responsive to pressure increase adapted to mitigate the force exerted upon the brake-applying elements at the back end of the vehicle.

2. A system of hydraulic front and rear brake control comprising a plunger means for operating the same, a piping system subjected to pressure created by said plunger, wheel-braking devices at the front and rear ends of a vehicle, separate piston means connected to said piping for operating the devices at each end, and resilient means adapted to be deflected by said piston means and thus to mitigate the force exerted upon the brake-applying elements at the back end of the vehicle.

3. A system of hydraulic front and rear brake control comprising a plunger means for operating the same, a piping system subjected to pressure created by said plunger, wheel-braking devices at the front and rear ends of a vehicle, separate piston means connected to said piping for operating the devices at each end, and resilient means pressed by a piston during continued application of a rear wheel braking device to mitigate the force exerted thereby and thus apportion a larger share of the braking power to the front wheels.

4. A system of hydraulic front and rear brake control comprising a plunger means for operating the same, a piping system subjected to pressure created by said plunger, wheel-braking devices at the front and rear ends of a vehicle, piston means connected to said piping for operating the devices at the front end, piston means for the rear end, resilient transmission means connecting said rear piston means with the rear braking devices, and resilient means adapted to be deflected by said rear piston means and thus to mitigate the force exerted upon the brake-applying elements at the back end of the vehicle.

5. A system of hydraulic front and rear brake control comprising a plunger means for operating the same, a piping system subjected to pressure created by said plunger, wheel-braking devices at the front and rear ends of a vehicle, separate piston means connected to said piping for operating the devices at each end, resilient transmission means initially stressed to a determined degree between the rear piston means and wheel-braking devices operated thereby, and resilient resistance means adapted to be deflected by said rear piston means and thus to mitigate the force exerted upon the brake-applying elements at the back end of the vehicle.

6. A system of hydraulic front and rear brake control comprising a plunger means for operating the same, a piping system subjected to pressure created by said plunger, wheel-braking devices at the front and rear ends of a vehicle, separate pressure cylinders connected to said piping at each end, piston means movable in a cylinder for operating braking devices at each end, and resilient resistance means interposed between the rear piston means and co-operating cylinder to oppose the continued movement of the piston means and thus apportion a larger share of the braking power to the front wheels.

7. A system of hydraulic brake control comprising wheel-braking devices at the front and at the rear of a vehicle, piston means movable in pressure cylinders for operating said devices, a common fluid column transmission to all said cylinders, means for applying pressure to said fluid column, and resilient means co-operating with the rear wheel braking device pistons to oppose continued movement thereof and apportion the larger braking effect to the front wheels.

8. A system of hydraulic brake control comprising wheel-braking devices at the front and at the rear of a vehicle, piston means movable in pressure cylinders for operating said devices, a common fluid column transmission to all said cylinders, means for applying pressure to said fluid column, initially stressed resilient transmission means for operating the rear devices from the rear piston means, and resilient resistance means arranged to oppose continued movement of said rear piston means thus apportioning the larger braking effect to the front wheels.

9. A system of hydraulic front and rear brake control comprising fluid-displacing means operated by braking control means, a piping system subjected to pressure created thereby, wheel-braking devices at the front and rear ends of a vehicle, separate means movable by fluid pressure in said system connected to said piping for operating the devices at each end, and resilient means coacting with the rear end operating means adapted to mitigate the force exerted upon the brake-applying elements at the rear end and increase that at the front end of the vehicle.

10. A system of hydraulic front and rear brake control comprising fluid-displacing means operated by braking control means, a piping system subjected to pressure created thereby, wheel-braking devices at the front and rear ends of a vehicle, separate means movable by fluid pressure in said system connected to said piping for operating the devices at each end, resilient transmission means initially stressed to a determined degree between the rear operating means and wheel-braking devices operated thereby, and resilient resistance means adapted to be deflected by said rear operating means and thus to mitigate the force exerted upon the brake-applying elements at the back end and increase that upon the front end of the vehicle.

In testimony whereof I have signed my name to this specification.

JOHN VERNON PUGH.